United States Patent
Taneja (10) Patent No.: US 9,433,189 B2
(45) Date of Patent: Sep. 6, 2016

(54) POP-TOP CAN FOOD DISPENSER ROBOT

(71) Applicant: Bruce Taneja, Naperville, IL (US)

(72) Inventor: Bruce Taneja, Naperville, IL (US)

( * ) Notice: Subject to any disclaimer, the term of this patent is extended or adjusted under 35 U.S.C. 154(b) by 103 days.

(21) Appl. No.: 14/454,070

(22) Filed: Aug. 7, 2014

(65) Prior Publication Data

US 2016/0037748 A1 Feb. 11, 2016

(51) Int. Cl.
*G06F 19/00* (2011.01)
*A01K 5/02* (2006.01)
*A01K 5/01* (2006.01)

(52) U.S. Cl.
CPC ........... *A01K 5/0291* (2013.01); *A01K 5/0114* (2013.01); *Y10S 901/02* (2013.01)

(58) Field of Classification Search
CPC .................................................... A01K 5/0291
USPC ................... 700/24, 245; 119/51.11
See application file for complete search history.

(56) References Cited

U.S. PATENT DOCUMENTS

2013/0247829 A1* 9/2013 Taneja ................. A01K 5/0291
119/51.11

* cited by examiner

*Primary Examiner* — McDieunel Marc (57) ABSTRACT

An automatic pet wet canned food dispenser robot has a robotic arm comprised of mechanical elements and motors, and a programmed microprocessor. The programmed microprocessor guides the robotic arm to grasp a food can and utilize levers and/or motors to open the pop top can, then the microprocessor guides the robotic arm to invert the opened food can over an empty bowl and shake out the food contents into a bowl for a pet at predetermined times setup by the pet owner whose presence is not required at time of feeding. The current invention utilizes advanced automation and programming to overcome prior limitations to deliver freshly opened canned food to pets without human presence required at the time of operation and does not require use of a can opener for opening the pop top cans.

15 Claims, 6 Drawing Sheets

THE MECHANICAL ARM PULLS OPEN POP TOP CAN'S TAB AND LID OFF THE CAN

FIG 1: A POP TOP (PULL TAB) CAN

FIG 2: SLEEVE (SLV) IS SLID OVER POP TOP CAN'S TAB

FIG 3: CAN DISPENSER WITH MECHANICAL ARM

FIG 4: THE MECHANICAL ARM LIFTS UP POP TOP CAN TAB

FIG 5: THE MECHANICAL ARM PULLS OPEN POP TOP CAN'S TAB AND LID OFF THE CAN

FIG 6: THE MECHANICAL ARM EMPTIES POP TOP CAN'S CONTENTS INTO A BOWL

FIG 7: MECHANICAL ARM COMPONENTS

POP-TOP CAN FOOD DISPENSER ROBOT

CROSS-REFERENCE TO RELATED APPLICATIONS

Ser. No. 13/792,543

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of automated pet food dispensers. More particularly, the present invention is in the technical field of automated dispensing of wet canned food to household pets from a pop top (pull tab) can. Pop top or pull tab wet food can is a can which can be opened without the use of a can opener by simply pulling on the tab on top of the can.

There have been a number of inventions in automated and timed dispensing of pet food for pets like dogs and cats, as often pet owners need to leave their homes for work or for a weekend and need their pets fed when they are gone. However, the problem is that most inventions on the market work well only for dispensing dry pet food. However, a large percent of pet owners prefer wet food since dry food contains very little moisture which can lead to dehydration in pets. Further, a large percent of pets prefer wet or moist food over dry food.

Almost all current inventions on market which dispense wet food require the pet owner to open hermetically sealed commercially available pop-top pet food cans and load their contents into various compartments of an automated dispenser hours or days in advance of when the food will be actually dispensed to pets. Such exposed wet food is susceptible to bacterial infection. Also open food attracts invertebrate pests, for example spiders, ants, flies, pill bugs which will infest food directly and lay eggs and indirectly infest food with their larvae. Finally open food could also attract mice, ants and create unhygienic contamination problems in homes or apartment buildings where pets and pet owners reside.

REFERENCES CITED

U.S. Patent Documents

| PATENT | Dated | Inventor | Limitations of Prior Art: |
|---|---|---|---|
| Patent Pending: 13/792,543 | March 2012 | Taneja | Requires an electric can opener to open a wet food can vs current invention which can open pop top (pull tab) cans without an electric can opener. |
| US 2008/0289580A1 | January 2010 | Krishnamurthy | 1. Wet food needs to be manually loaded into pie shaped compartments, once exposed to air, food become unhygienic for pet consumption over next few days. 2. Maximum 6 servings before a wash and reload is required which could be annoying and limiting for pet owner. |
| US 2005/0066905A1 | March 2005 | Morosin et. al. | 1. Wet food loaded will go bad after ice packs have stopped providing sufficient cooling. 2. Limited loading capacity which is predetermined by the product not the pet owner. |
| 4,077,360 | March 1978 | Figlia, A. | 1. Single (1 can) feed automated can dispenser. 2. Sharp edges on can, not safe for pet feeding. |

Prior Art Limitations: All wet pet food dispenser prior arts, with exceptions of U.S. Pat. No. 4,077,360 by Figlia, and Ser. No. 13/792,543 by Taneja, require a pet owner to open the hermetically sealed cans many hours or days in advance of when the food will actually be served to their pets. The noted exception, U.S. Pat. No. 4,077,360 by Figlia, which opens the hermetically sealed can at time of serving, is limited to serving only 1 can which is not sufficient for pet owners looking for multiple food can servings at one time, or multiple food cans being served over a period of time. Further this noted art by Figlia serves the opened food can with sharp edges which could tear a pet's tongue or skin around the pet's mouth and hence the opened food can is not safe for pets to eat out of. The second noted exception Ser. No. 13/792,543 by Taneja requires a can opener to open the hermetically sealed can.

SUMMARY OF THE INVENTION

The present invention relates to an automatic wet food dispenser machine which consists of a programmed microprocessor and a mechanical arm driven by motors which is utilized to remove the lid from a pop top wet food can, followed by emptying the contents of the food can into a bowl.

NASA's website defines a robot as a programmable, self-controlled device consisting of electronic, electrical, or mechanical units. In the present invention, a microprocessor and a mechanical arm are collectively referred to as a robot, where the microprocessor contains programming to determine when and where to position the mechanical arm in order for this invention to complete its function of opening a food can and serving the food without presence of a human being. Further, this function can be executed repeatedly at predetermined times without any human intervention at times of operation.

The programmed microprocessor instructs the mechanical arm to move wet food pop top can to a lid removal area, where by use of microprocessor guided mechanical arm assisted by motors and levers, the lid from the pop top can is removed and discarded. The microprocessor then instructs the mechanical arm to lift the food can and invert it, then shake it over an empty bowl thereby emptying the contents into the bowl.

Please also note that the mechanical arm could be designed with various alternate designs, in which the position of motors and its various mechanical parts can be made and assembled differently, while still achieving the function of moving a food can. In fact, this mechanical arm need not look like a mechanical arm at all, and could be a mechanical machine with some similarity to a coffee or soda vending machine where the cans will slide with help of gravity or be moved by levers or by other mechanical means. The objective is simply to move a wet food can and open the pop top can lid utilizing levers and motors. After the food can's lid has been removed, this mechanical machine empties the food can into a serving bowl, which could be done by mechanically grasping and inverting the food can and using a shaking motion to allow gravity to empty out the contents into a below placed bowl.

Since the hermetically sealed food can is opened just prior to the pop top wet food can being dispensed, and not hours or days prior to the food being consumed, the present invention hence overcomes the prior arts' shortcomings related to hygiene noted earlier. Hence, this invention drastically reduces the risk of bacterial, bug and rodent infestation which is a threat to the health of pets and pet owners.

The microprocessor can be setup by the user to open and serve the canned pet food at certain times, intervals or a when certain events occur such as pet approaching the pet feeding area or when the previous bowl is empty or perhaps when a "dispense now" button is pressed.

Please note while this invention is primarily designed to serve canned food to pets, it can also serve canned food to disabled humans who could use such a device to serve human food to them at predetermined times.

PARTS REFERENCE LIST

| GM | Gripper Motor | GMO | Gripper motion direction |
| WM | Wrist Motor | WMO | Wrist motion direction |
| EM | Elbow Motor | EMO | Elbow Motion direction |
| SM | Shoulder Motor | SMO | Shoulder Motion direction |
| BM | Base Motor | BMO | Base Motion direction |
| SLV | Sleeve Lever | HK | Hook on Gripper |
| CAN | Pop top (pull tab) can | LID | Lid on the CAN |

-continued

| Gripper | Gripper | Mechanical Arm | Also known as the Robot or Robot Arm comprises of parts GM, WM, EM, SM, BM, Gripper, HK, UA, FA. |
| UA | Upper Arm | | |
| FA | Fore Arm | | |

DETAILED DESCRIPTION OF THE INVENTION

Figure 1:
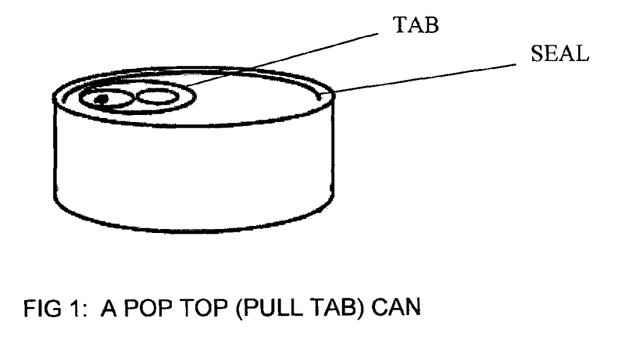
FIG. 1 is a perspective view of a pop top or pull tab can for which a lid can be removed without a can opener.

Referring now to the invention in more detail, FIG. 1 shows a typical pop top can. Following steps show how this invention would work, though some variations are possible.

Figure 2:
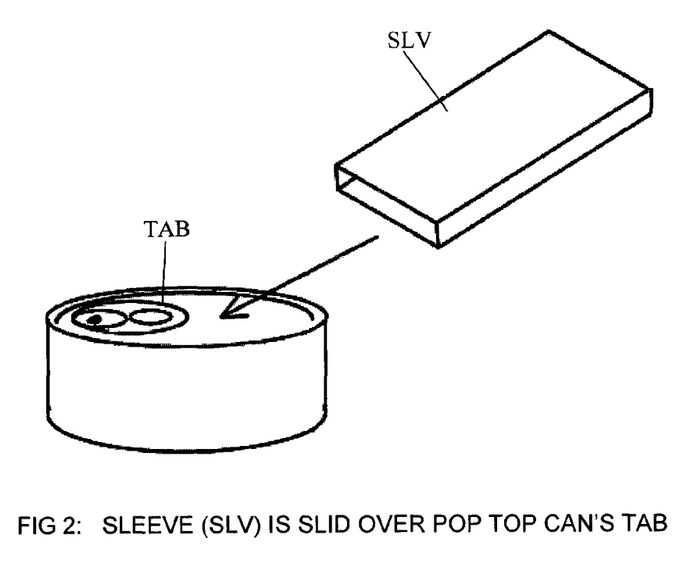
FIG. 2 is a perspective view showing that sleeve lever (SLV) would be slid over the pop top can's tab by the user of the system.
Figure 4:
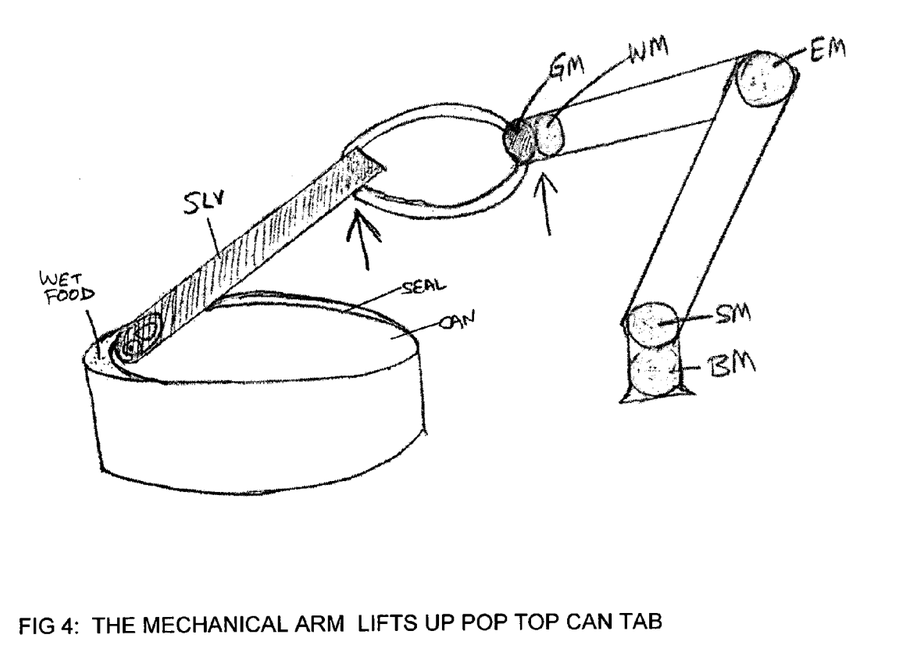
FIG. 4 is a perspective view showing mechanical arm pushing up the sleeve lever which will cause the can lid to start detaching from the pop top can.
Figure 5:
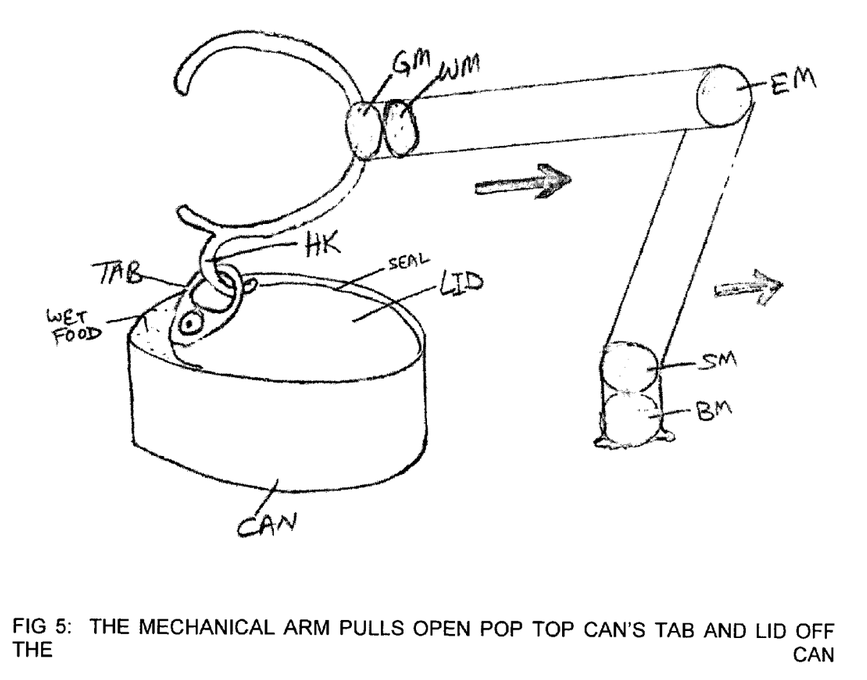
FIG. 5 is a perspective view showing the mechanical arm uses a built in hook to pull on the hook in order to completely remove the lid from the can.
Figure 6:
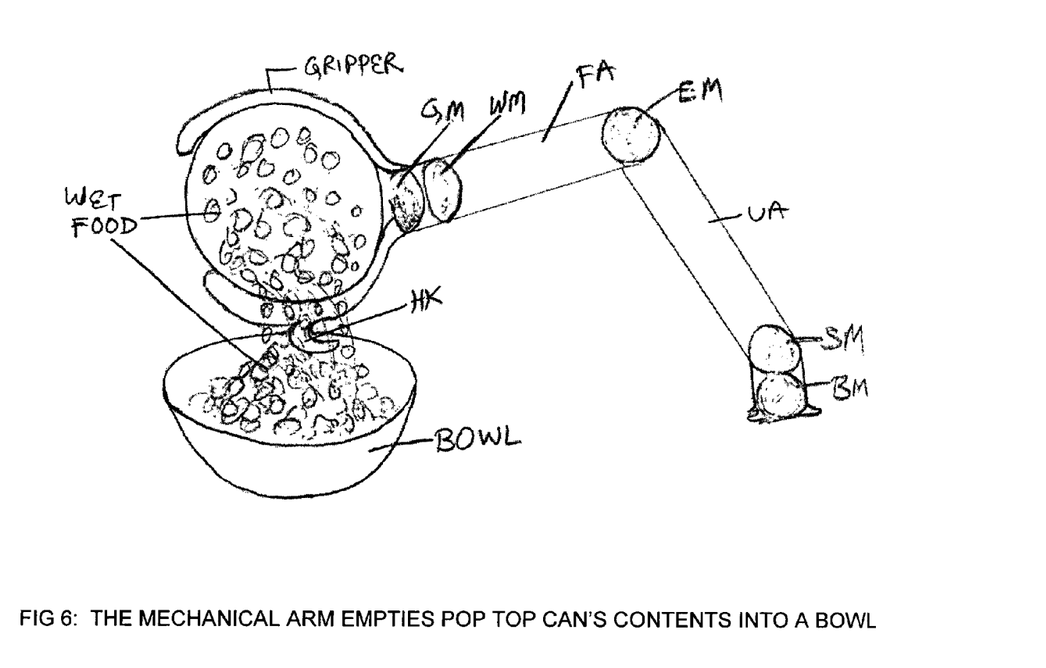
FIG. 6 is a perspective view showing the mechanical arm uses its gripper to lift and invert the opened food can over a bowl. With shaking motion and gravity, the food is emptied from the can into the bowl below.

1. Please refer to FIG. 2. The user of the system will slip a sleeve over a pop top can's tab which acts as a lever to open the can in later steps.
2. Now please refer to FIG. 3. The user of the system then stacks up these pop top cans into a dispenser which is accessible to the mechanical arm.
3. Using the can sensor and by moving the mechanical arm up and down facing the stack of pop top cans, the invention can determine which is the tallest pop top can on the stack.
4. At a predetermined time, without human presence required, the mechanical arm which is also referred to as the robot arm or robotic arm, will grasp the pop top can on the top most position on the stack and set the can down nearby the dispenser, where the lid removal operation is performed as follows.
5. Now please refer to FIG. 4. and FIG. 7. The mechanical (robot) arm will push up on the lever in order to easily pull the tab up on the pop top can. This action breaks the seal of the pop top can and loosens the lid for next step of the lid removal. Not shown are clips required to hold the base of the can to prevent the body of the can from moving as the tab is pulled up.
6. Now please refer to FIG. 5. and FIG. 7. Utilizing a hook built on the gripper, the robot arm pulls off the lid. Note that robot arm could use the single shoulder motor (SM) only to perform this pulling function, or robot arm can be programmed to use shoulder motor (SM) as we well as elbow motor (EM) to collectively pull on the can's tab. Not shown are clips required to hold the base of the can to prevent the body of the can from moving as the lid is pulled off the can. This step of pulling the lid off the can's body can be optionally performed by utilizing a motor and a hook without involving the robot arm. This step can be also optionally performed by utilizing a mechanical lever that is capable of pulling off the lid completely without utilizing the robot arm. At the end of this step, the robot arm discards the lid into a trash area (not shown) which can be a trash tray or a trash bag located within the reach of the robot arm.
7. Now please refer to FIG. 6. The robot arm utilizes its gripper to grasp the opened can and inverts it over a bowl while leveraging gravity and a shaking motion to empty out the contents of the opened can into the bowl. This bowl will be either already accessible to a pet or the robot arm can gently push the bowl out to a pet accessible area.

Figure 3:
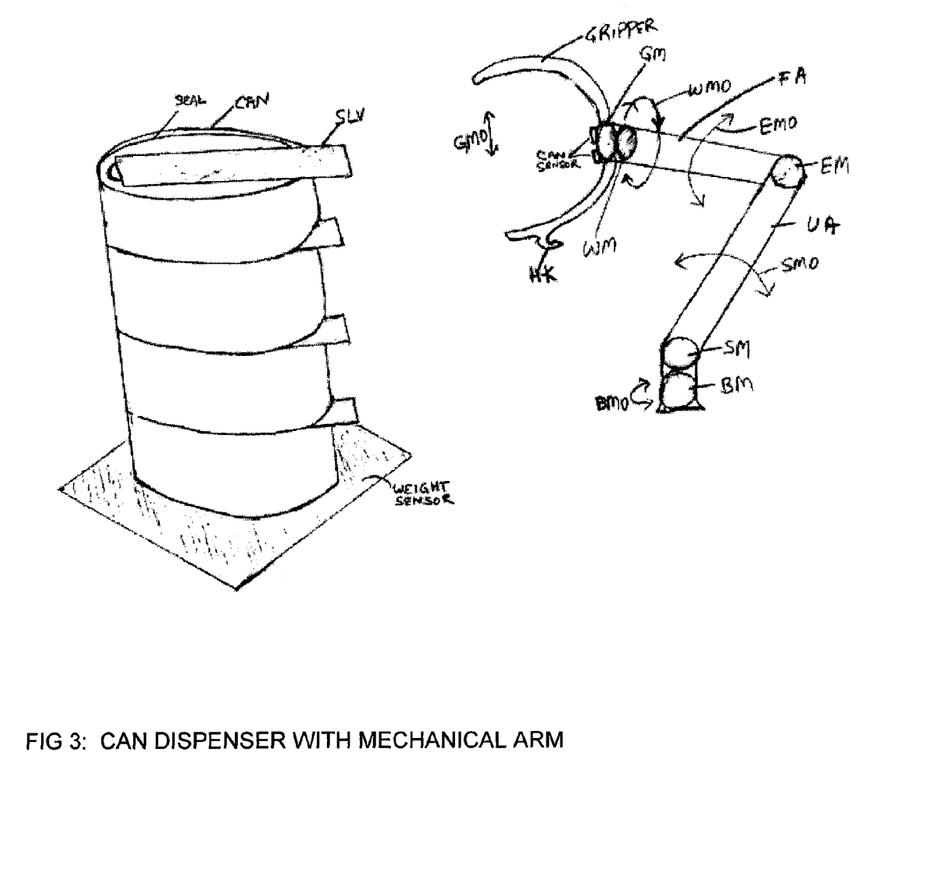
FIG. 3 is a perspective view showing how a user would stack up cans in the dispenser with lever sleeves installed on each can. This figure also shows a mechanical arm which is capable of removing a can from the can dispenser to ready it for lid removal without human intervention.
Figure 7:
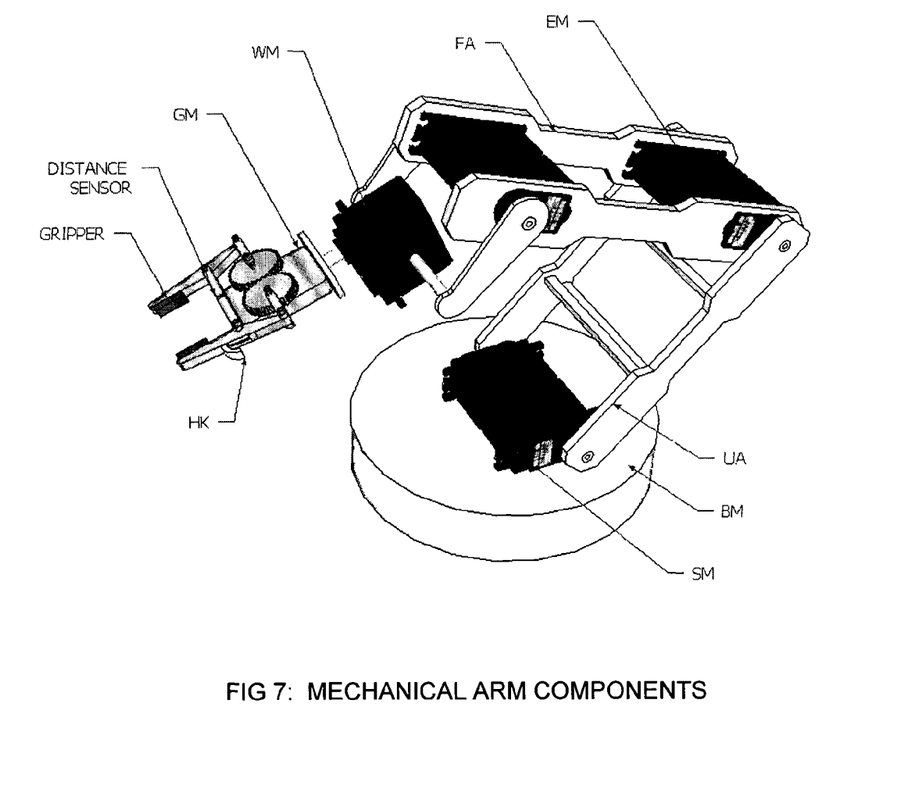
FIG. 7 is a perspective view showing the mechanical arm components detail.

Now please refer to mechanical (robot) arm in FIG. 3. and FIG. 7. The robot arm comprises of:
1. BM (base motor), which allows the robot arm to turn its entire body along motion indicated as BMO.
2. SM (Shoulder motor), which allows robot arm to move its UA (Upper Arm) along the motion indicated as SMO, which allows the robot arm to rock itself forward and back to primarily increase or decrease reach to objects closer or farther from the robot arm.
3. EM (Elbow motor), which allows the robot arm to move its FA (Fore Arm) along the motion indicated as EMO, which allows the robot arm to primarily control its height.
4. GM (Gripper motor), which allow the robot arm to open or close it's Gripper (gripper).
5. WM (Wrist motor), which allow the robot arm to rotate its gripper along the rotational direction indicated by WMO.
6. HK (Hook)—allows the robot arm to hook itself into objects where a pulling motion is required such as the tab of a can as described earlier.
7. Programmed Microprocessor—not shown is a programmed microprocessor which is programmed and wired to all motors so that the robot arm can be moved around to a series of predetermined positions by signaling various motors to move to certain angles at certain timings and with appropriate delays such as to create a various motions of the robot arm in order to perform the required functions.
8. CAN SENSOR or DISTANCE SENSOR—is a camera or an ultrasonic sensor or an infrared sensor mounted on the mechanical arm. This allows the programmed microprocessor to detect presence of a pop top can in front of the mechanical arm by taking images and analyzing them, or by emitting ultrasonic sound or infrared rays and noting the delay in bounce back. This delay is then used to compute the distance of a pop top can from the mechanical arm.

WEIGHT SENSOR—senses the weight of the can stack and reports it to the Programmed Microprocessor, which in turn using a predetermined programmed weight of the pop top cans determines how many cans are present and the precise position of the top most pop top can in the stack and directs the mechanical arm to grasp that top most can. Please note that at least one of these sensors is required to determine the top most can in the can stack: CAN SENSOR, DISTANCE SENSOR or WEIGHT SENSOR.

Please note that the positions of motors could be interchanged. For example, the motor WM, which rotates the robot gripper Gripper, could be optionally placed in parallel to the Gripper or at the end of UA with no loss in functionality as now instead of rotating just the wrist, we would still rotate the wrist along with rotating the arm components FA, which is inconsequential since the objective is to rotate the gripper Gripper.

The user of this invention can setup times or intervals or type of events of when the device will actually open and serve the canned food utilizing a touch panel interface (not shown) or alternatively through other wireless means such as a smart phone app or from a PC over a wired or wireless network.

Most of the base, housing and framing material used in both the can opener and the robotic arm could be injection molded plastic or metal. Most motors can be either off the shelf $3^{rd}$ party servo, stepper or DC motors available from a number of vendors, and these motors can be controlled by the programmed microprocessor with high precision.

Suggested dimensions of the robots arm components UA, FA are 2 to 6 inches long each. However, these dimensions are changeable as long as the programming on the microprocessor is adjusted to accommodate the degrees by which each of the motors connected between these arms will be rotated in order to achieve the effect of moving the wet food can to and from the can opener as described earlier.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:
1. An automatic wet food can opener and server machine, comprising
   a) a wet food pull tab (pop top) can sensor
   b) a programmed processor receiving input from said sensor; said processor commanding said motors' rotation,
   c) a plurality of motors and elongated elements of predetermined lengths, wherein some of said elongated elements are connected to said motors so that said motors urge said elongated elements means for enabling physical movement of a hermetically sealed wet food pull tab (pop top) can to predetermined positions, and
   d) at least one leverage element and at least one motor means for mechanically pulling tab on a hermetically sealed wet food pull tab (pop top) can thereby separating the lid of said food can,
   whereby said wet food can will be opened and contents of said wet food can served at predetermined times without any human presence required.

2. The automatic wet food can opener and server machine of claim 1, wherein said leverage elements can be utilized to mechanically open a tab of said can.

3. The automatic wet food can opener and server machine of claim 1, comprising
   a) said plurality of motors and elongated elements comprising a mechanical arm means for grasping and moving and inverting said wet food can, and
   b) said leverage elements comprising a lever and a hook and said motor means for pulling tab on said food can thereby separating the lid of said food can, and
   c) said programmed processor means for commanding said motors, whereby said wet food can will be opened and contents of said wet food can served at predetermined times without any human presence required.

4. The automatic wet food can opener and server of claim 3, wherein said leverage element hook is connected to said mechanical arm.

5. The automatic wet food can opener and server of claim 3, wherein said leverage elements a lever and hook are comprised into a single hook, whereby the hook provides a lever function.

6. The automatic wet food can opener and server machine of claim 3, wherein said leverage elements can be utilized to mechanically push open a tab of said can.

7. The automatic wet food can opener and server of claim 1, further including a touchscreen display means for displaying status and to allow user to enter times or intervals for when a wet food can will be opened and served by the present device.

8. The automatic wet food can opener and server of claim 1, further including a wireless interface such as Bluetooth and a smartphone application means for displaying status and to allow user to enter times or intervals for when a wet food can will be opened and served by the present device.

9. The automatic wet food can opener and server of claim 1, further including a network interface and a website means for allowing user to use a web browser to enter times or intervals for when a wet food can will be opened and served by the present device.

10. The automatic wet food can opener and server of claim 1, further including a can dispenser wherein the wet food cans are stored by user of the present device, wherein said plurality of motors and elongated elements remove said wet food can from said food can rack at predetermined time before being opened and served by the present device.

11. The automatic wet food can opener and server machine of claim 1, wherein said wet food pull tab (pop top) can sensor is an ultrasonic distance sensor.

12. The automatic wet food can opener and server machine of claim 1, wherein said wet food pull tab (pop top) can sensor is an infrared distance sensor.

13. The automatic wet food can opener and server machine of claim 1, wherein said wet food pull tab (pop top) can sensor is a camera.

14. The automatic wet food can opener and server machine of claim 1, wherein said wet food pull tab (pop top) can sensor is a weight sensor.

15. The automatic wet food can opener and server machine of claim 1, wherein said predetermined time is established by programmed processor.

* * * * *